United States Patent
Itaenen et al.

(10) Patent No.: US 11,907,992 B2
(45) Date of Patent: Feb. 20, 2024

(54) METHODS AND SYSTEMS FOR COLOUR-BASED IMAGE ANALYSIS AND SEARCH

(71) Applicant: Shopify Inc., Ottawa (CA)

(72) Inventors: Niklas Itaenen, Ottawa (CA); Kshetrajna Raghavan, Fremont, CA (US); Xiaoxiao Li, Oakville (CA); Kyle Bruce Tate, Ottawa (CA); Siphumelele Langeni, Brampton (CA); Peng Yu, Montreal (CA)

(73) Assignee: Shopify Inc., Ottawa (CA)

( * ) Notice: Subject to any disclaimer, the term of this patent is extended or adjusted under 35 U.S.C. 154(b) by 51 days.

(21) Appl. No.: 17/712,210

(22) Filed: Apr. 4, 2022

(65) Prior Publication Data
US 2023/0316368 A1 Oct. 5, 2023

(51) Int. Cl.
*G06K 9/00* (2022.01)
*G06Q 30/0601* (2023.01)
*G06T 7/90* (2017.01)
*G06F 16/583* (2019.01)

(52) U.S. Cl.
CPC ..... *G06Q 30/0627* (2013.01); *G06F 16/5838* (2019.01); *G06T 7/90* (2017.01); *G06T 2207/20132* (2013.01)

(58) Field of Classification Search
CPC .............. G06F 16/5838; G06T 7/90; G06T 2207/20132
See application file for complete search history.

(56) References Cited

U.S. PATENT DOCUMENTS

| | | | | |
|---|---|---|---|---|
| 10,282,431 | B1 * | 5/2019 | Bhotika | G06F 16/5838 |
| 10,546,352 | B2 * | 1/2020 | Systrom | G06Q 30/0255 |
| 2007/0081744 | A1 * | 4/2007 | Gokturk | G06V 40/107 |
| | | | | 382/176 |
| 2008/0177640 | A1 * | 7/2008 | Gokturk | G06Q 30/0625 |
| | | | | 705/26.62 |
| 2009/0041345 | A1 * | 2/2009 | Tirumalareddy | G06F 16/5838 |
| | | | | 382/165 |

(Continued)

FOREIGN PATENT DOCUMENTS

WO WO2013072647 A1 * 5/2013

OTHER PUBLICATIONS

New Trends and Ideas in Visual Concept Detection, Mark J Huiskes et al., ACM, 2010, pp. 527-536 (Year: 2010).*

(Continued)

*Primary Examiner* — Jayesh A Patel
(74) *Attorney, Agent, or Firm* — Rowand LLP

(57) ABSTRACT

Computer-implemented methods and systems for colour-based image tagging and colour-based searching. The method may include identifying, using image analysis, one or more dominant colours of a product based on an image of the product and receiving selection of at least one of the one or more dominant colours. In response to receiving the selection of the at least one of the one or more dominant colours, a search for products matching the at least one of the one or more dominant colours may be initiated to obtain one or more results of the searching, the one or more results including at least one product matching the at least one of the one or more dominant colours.

17 Claims, 8 Drawing Sheets

(56) References Cited

U.S. PATENT DOCUMENTS

| | | | | |
|---|---|---|---|---|
| 2013/0044944 | A1* | 2/2013 | Wang | G06V 10/764 707/769 |
| 2013/0085893 | A1* | 4/2013 | Bhardwaj | G06T 7/13 705/26.62 |
| 2013/0166591 | A1* | 6/2013 | Nandyal | G06F 16/951 707/769 |
| 2013/0262228 | A1* | 10/2013 | Gershon | G06Q 30/0255 705/14.53 |
| 2014/0188842 | A1* | 7/2014 | Vuong | G06F 16/9038 707/722 |
| 2015/0058160 | A1* | 2/2015 | Cao | G06T 7/66 705/26.7 |
| 2015/0106235 | A1* | 4/2015 | Gershon | G06Q 30/0643 705/26.63 |
| 2015/0332479 | A1* | 11/2015 | Gershon | G06T 7/11 382/164 |
| 2019/0080198 | A1* | 3/2019 | Weigel | G06F 16/951 |

OTHER PUBLICATIONS

Content-based image retrieval by integrating color and texture features, Xiang-Yang Wang et al., Springer, 2012, pp. 545-569 ( Year: 2012).*

Personal Clothing Retrieval on Photo Collections by Color and Attributes, Xianwang Wang et al., IEEE, 2013, pp. 2035-2045 ( Year: 2013).*

Colour measurements by computer vision for food quality control—A review, Di Wu et al., Elsevier, 2013, pp. 5-20 (Year: 2013).*

Hierarchical convolutional neural networks for fashion image classification, Yian Seo et al., Elsevier, 2019, pp. 328-339 (Year: 2019).*

Machine Learning for Colour Palette Extraction from Fashion Runway Images, Peihun Lai et al., University of Leeds, 2020, pp. 334-340 (Year: 2020).*

\* cited by examiner

114

E-Commerce Platform

Q Search

JG John's Apparel
Jonny B. Good

Good afternoon, Jonny B.

Here's what's happening with your store today.

Today's total sales    Today's visits
$98.00              1

All channels ⌄    Today ⌄

TOTAL SALES
$98.00

$125
$75
$25

12am    8pm    4pm    11pm
                Jun 1
                2 orders

TOTAL SALES BY CHANNEL    View dashboard    Jun 1
                                                0 orders Online Store
$0.00                                           0 orders Mobile app
$0.00                                           0 orders Shopify POS (126 York St.)
$0.00                                           0 orders ● Update your Platform Payments tax details
We require additional information to verify your identity.
Update tax details ● Advanced Cash on Delivery has been deactivated for your store
See why ⌂ Home
🛒 Orders
◇ Products
○ Customers
📊 Reports
🏷 Discounts
🧩 Apps SALES CHANNELS ⊙
⊛ Online Store
▢ Mobile App
View all channels ⚙ Settings

FIG. 8

METHODS AND SYSTEMS FOR COLOUR-BASED IMAGE ANALYSIS AND SEARCH

TECHNICAL FIELD

The present disclosure relates to computer-implemented search methods, and more particularly to, methods and systems for colour-based searching for products based on an image.

BACKGROUND

Users may sometimes search for an item having a particular colour. Such is often the case in the context of online commerce where a user is searching for a product having a particular colour. This can be a frustrating exercise in part because products and/or images of products are not necessarily properly identified by colour. Products or images of products may not have any associated colour information or labelling, or may include inconsistent colour data due to manual labelling errors. Moreover, even if specified in the product name or page the colour name may not be known to the user, particularly when the merchant uses its own custom colour naming.

BRIEF DESCRIPTION OF THE DRAWINGS

Embodiments will be described, by way of example only, with reference to the accompanying figures wherein:

FIG. 8 is an example of a home page of an administrator, in accordance with an example embodiment.

Like reference numerals are used in the drawings to denote like elements and features.

DETAILED DESCRIPTION OF EMBODIMENTS

Figure 1:
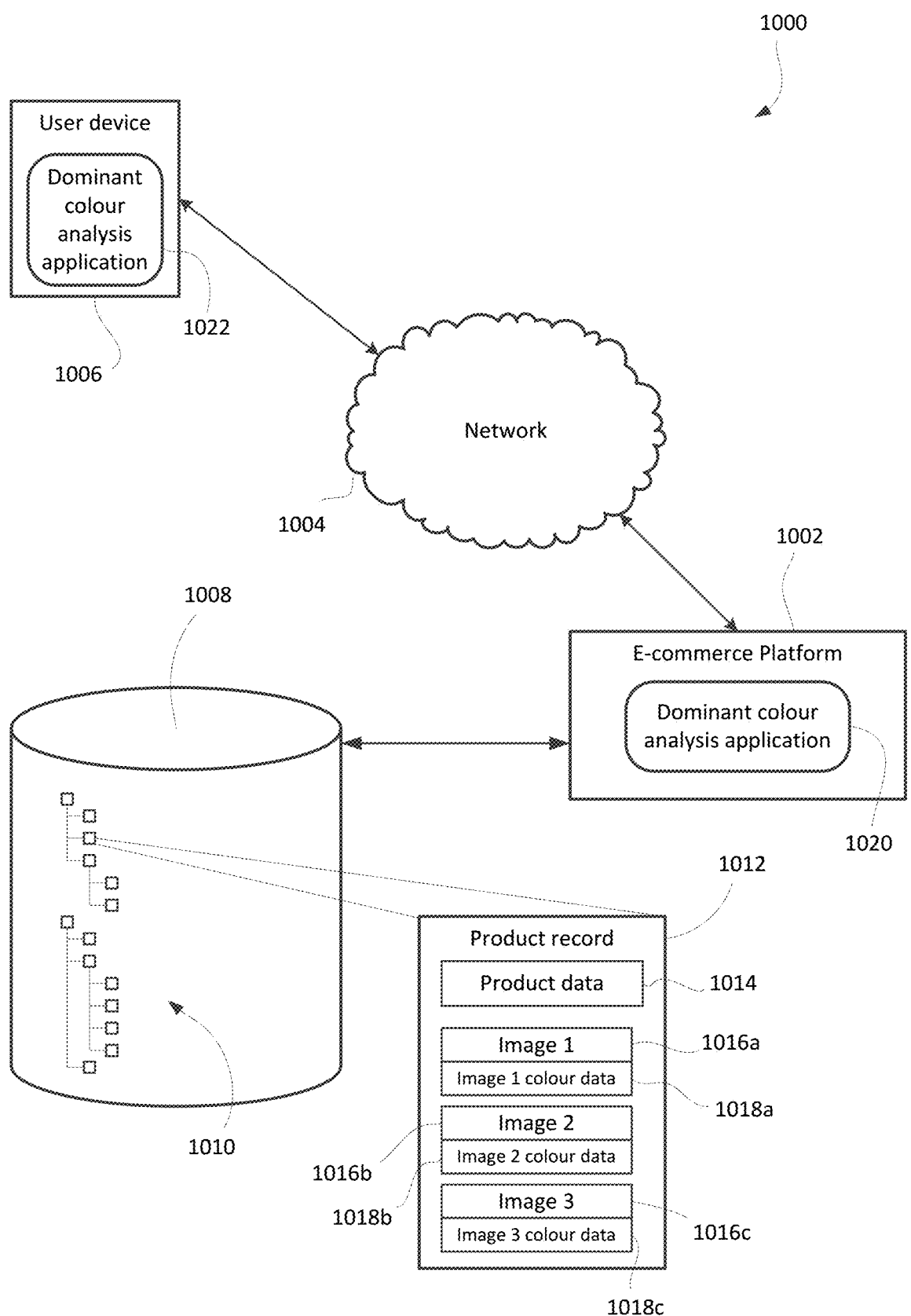
FIG. 1 is a simplified example system.

In one aspect, the present application discloses a computer-implemented method. The method may include identifying, using image analysis, one or more dominant colours of a product based on an image of the product; receiving selection of at least one of the one or more dominant colours; responsive to receiving the selection of the at least one of the one or more dominant colours, searching for products matching the at least one of the one or more dominant colours; and providing one or more results of the searching, the one or more results including at least one product matching the at least one of the one or more dominant colours.

In some implementations, searching includes searching a product database using a search query that includes, as a query parameter, the at least one of the one or more dominant colours.

In some implementations, the one or more results include at least one product image tagged with the at least one of the one or more dominant colours. In some cases, the at least one product image includes a product image tagged with a dominant colour value, and wherein the dominant colour value is within a maximum distance of said at least one of the one or more dominant colours.

In some implementations, the image analysis includes detecting the product within the image using object detection and, based on the objection detection, selecting a portion of the image containing the product and excluding at least a part of the image not containing the product. In some implementations, the selecting include applying a bounding box based on the object detection to crop a part of the image not depicting the product to obtain a cropped image. In some implementations, the selecting alternatively or also includes applying a mask selected based on the product to select the portion of the image containing the product.

In some cases, selecting a portion includes selecting a machine learning model associated with a product class containing the product, and applying the machine learning model to select the portion of the image.

In some implementations, the image analysis further includes classifying each pixel within the portion of the image based on its colour values into a respective range within a set of ranges, each range corresponding to a colour, and wherein identifying includes determining a count of pixels in each range and identifying the colour corresponding to the range with a highest count. This may include selecting a machine learning model associated with a product class containing the product, and applying the machine learning model to perform the classifying. In some cases, the classifying may include applying k-means clustering to the pixels within the portion, and wherein the k values of the k-means clustering are set based on a product class to which the product belongs.

In some implementations, the method may include transmitting data regarding the identified one or more dominant colours for display via a user interface on a user device, and receiving the selection from the user device based on an input received at the user device.

In some implementations, identifying includes identifying a coarse set of dominant colours using a coarse colour analysis and identifying a fine set of dominant colours using a fine colour analysis, receiving user selection of one of the coarse colour analysis or fine colour analysis, and causing graphical display, on a user interface, of the dominant colours of the selected one of the coarse colour analysis or fine colour analysis.

In some implementations, receiving selection includes causing graphical display of the one or more dominant colours on a user interface, and receiving selection of the at least one of the one or more dominant colours via the user interface. In some cases, the graphical display is overlaid on the image of the product. In some cases, the graphical display includes displaying a primary dominant colour and a secondary dominant colour, and wherein receiving selection includes receiving selection of the secondary dominant colour, and wherein a search query parameter specifies the secondary dominant colour.

In some implementations, the search query includes a search for the selected at least one of the one or more dominant colours as a secondary dominant colour, and wherein the search results include an image of the at least one product tagged with the at least one of the one or more dominant colours as its secondary dominant colour.

In some implementations, the method may further include receiving user input identifying a point on the image, and performing object detection within the image based, at least in part, on the point to identify the product within the image.

In some implementations, the method may further include obtaining the image of the product from a camera within a user device or from a product record in a product database.

In another aspect, the present application discloses a computing device having a processor and memory. The memory may store instructions that, when executed by the processor, cause the processor to carry out one of the methods or processes described herein.

In yet another aspect, a non-transitory, computer readable storage medium is disclosed. The medium may store processor-executable instructions that, when executed, cause one or more processors to carry out the operations of one or more of the methods or processes described herein.

Other example embodiments of the present disclosure will be apparent to those of ordinary skill in the art from a review of the following detailed descriptions in conjunction with the drawings.

In the present application, the term "and/or" is intended to cover all possible combinations and sub-combinations of the listed elements, including any one of the listed elements alone, any sub-combination, or all of the elements, and without necessarily excluding additional elements.

In the present application, the phrases "at least one of . . . and . . . " is intended to cover any one or more of the listed elements, including any one of the listed elements alone, any sub-combination, or all of the elements, without necessarily excluding any additional elements, and without necessarily requiring all of the elements. Similarly, the phrase "at least one of . . . or . . . " is also intended to cover any one or more of the listed elements, including any one of the listed elements alone, any sub-combination, or all of the elements, without necessarily excluding any additional elements, and without necessarily requiring all of the elements.

In the present application, the term "e-commerce platform" refers broadly to a computerized system (or service, platform, etc.) that facilitates commercial transactions, namely buying and selling activities over a computer network (e.g., Internet). An e-commerce platform may, for example, be a free-standing online store, a social network, a social media platform, and the like. Customers can initiate transactions, and associated payment requests, via an e-commerce platform, and the e-commerce platform may be equipped with transaction/payment processing components or delegate such processing activities to one or more third-party services. An e-commerce platform may be extendible/extensible by connecting one or more additional sales channels representing platforms where products can be sold. In particular, the sales channels may themselves be e-commerce platforms, such as Facebook Shops™, Amazon™, etc. The e-commerce platform may serve one merchant in some implementations. The e-commerce platform may be a multi-merchant platform in other cases, where each merchant is able to use some or all of the available services to configure an online storefront and provide commerce services to customers of the online storefront. A multi-merchant e-commerce platform may operate across a range of geographic regions, and may operate in multiple countries, currencies, and time zones.

The present application refers to searches for an "item" based on colour. The search results may include an item record which may include one or more images of the item. The term "item" may refer to any identifiable object that may be the subject of a search. In many of the examples described below, the item is a "product" in an e-commerce context. Examples below may describe searching for a product within specific product classes or sub-classes, such as apparel or t-shirts, for instance. The search may be by primary dominant colour of the product or secondary dominant colour of the product, in some embodiments. It will be appreciated that the "product" and the examples herein are not intended to limit the scope of the present application to the e-commerce context or to limit the scope of the present application to searching for products offered for sale. The present application may be applied in any other context in which an item record may be the subject of a search query where colour data forms part of the search parameters.

As noted above, in many online systems users may seek an item having a particular colour. This occurs in the context of online commerce where a user is searching for a product having a particular colour. Many databases of products (or other items) may have missing or incomplete colour data. If a product record does include colour data, whether in the title of the product, the description of the product, or in metadata regarding the product, the colour data is typically the principal colour of the product only. Textual colour data found as metadata in association with a product or image of a product may be simplified, for instance that the product is "blue" or "red" rather than any particular shade of those colours. In some cases, a merchant may use non-standard colour naming, e.g. "electric orange", "sunlight", or "space grey", which makes it difficult for user's to search unless they know the merchant's custom naming conventions.

To the extent that a commerce website or user interface provides a search function, it may allow a user to select from among a list of pre-specified colours for that product item. That functionality is typically only available for select products for which colour data has been specified and the selection is specific to the principal colour for the product.

As a result it is difficult to obtain accurate and complete search results based on colour. Moreover, colour-based searching or filtering, to the extent that it is possible, is limited to a principal colour of a product.

The present application provides improved methods and systems for searching for items by colour. In one aspect, the present application provides for the automated tagging of item records and/or item images with colour data. The colour data may be obtained through applying dominant colour image analysis to one or more images of the product. The dominant colour image analysis may identify one or more dominant colours featured in the one or more images of the product. The analysis may result in identifying a primary dominant colour and one or more secondary dominant colours, in some examples. The dominant colour data may be stored in association with the product record and/or the image(s) of the product.

In another aspect, the present application provides for the application of dominant colour image analysis to an image of an item, display of that dominant colour data on a graphical user interface, receipt of selection of one or more of the displayed dominant colours, and the generation of a search query for other items, where the search query includes the selected one or more dominant colours as a search parameter. As will be described below, the selected dominant colour may be a dominant colour other than the principal (e.g. most dominant) colour of the image of the item. In some cases, the search query may be for items that feature the selected colour as a secondary dominant colour.

Reference will now be made to FIG. 1, which diagrammatically illustrates a simplified example system 1000 in accordance with an aspect of the present application. The example system 1000 may include an e-commerce platform 1002. The e-commerce platform 1002 may provide for one or more online storefronts. One or more of those online storefronts may be browsable by a user computing device, such as a consumer device 1006. The consumer device 1006 may connect to the e-commerce platform 1002 via one or more computing networks 1004, such as the Internet. The consumer device 1006 may include any suitable computing device with at least a display screen and a user input device, such as a mobile smartphone, tablet, laptop, desktop, or other such devices. In some embodiments, the consumer device 1006 includes one or more cameras to capture digital images.

The e-commerce platform 1002 may be coupled to a database 1008. The database 1008 may be maintained by the e-commerce platform 1002. Data within the database 1008 may include product records 1010 relating to items made available via the one or more online storefronts. The product records 1010 may be stored in the database 1008 in a hierarchical format. In some cases, the product records may be grouped first by merchant (e.g. storefront to which they belong) and then by product class, subclasses, etc. In some cases, product records 1010 may be grouped first by product class, then by subclass, etc, and span multiple merchants. Some of the product records 1010 may include one or more images of the product.

An example product record 1012 may include product data 1014 and one or more images 1016 (shown individually as 1016a, 1016b, 1016c) of the product. Example product data 1014 may include a name or title of the product, product class or subclass identifiers, and product specifications such as size, dimensions, weight or other such data identifying the specific product. The product data 1014 may further include a narrative description of the product, pricing data, or other product-related information. Although the images 1016 are shown as part of the product record 1012, it will be appreciated that the images 1016 may be stored separately from the product record 1012 and the product record 1012 may include a link, reference, or other identifier of the images 1016 with which it is associated.

As will be described below, dominant colour image analysis may be carried out with respect to one or more of the images 1016 to identify one or more dominant colours associated with each of the images 1016. That colour data 1018 (shown individually as colour data 1018a, 1018b, 1018c) may be stored in association with images 1016. As will be described further below, the colour data 1018 may identify one or more dominant colours for the product shown in the image. The colour data 1018 may identify the colour(s) by name or may identify the colour(s) by specifying colour parameters, e.g., hex values, RGB values, CMYK value, PMS number, CIELAB values, XYX values, etc. The colour(s) may be based on predetermined taxonomy of colours, such as Pantone™ colours, the RGB colour space, the YCoCg colour space, or others. In some cases, rather than (or in addition to) storing the colour data 1018 of each image in association with that image, the colour data 1018 for one image may be selected, or the colour data 1018 for multiple images may be combined (e.g. through averaging or other operations), and stored as colour data 1018 in the product record 1012 as part of the product data 1014.

In some implementations, the e-commerce platform 1020 may include a dominant colour analysis application 1020. The dominant colour analysis application 1020 may be configured to perform image analysis with respect to an image of a product so as to identify one or more dominant colours of the product shown in the image. In some cases, a measure of strength or dominance or probability may be determined for each dominant colour identified. That is, the dominant colour analysis application 1020 may identify one or more dominant colours from an image of a product and, for each dominant colour, an associated dominance metric. The dominance metric may reflect the degree to which that colour is dominant vis-à-vis other colours in at least a portion of the image containing the product. In some cases, the dominance metric may reflect the deviation of colour values about the dominant colour identified. In some cases, the dominance metric is stored as part of the colour data 1018.

In some implementations, the consumer device 1006 may include a dominant colour analysis application 1022. The dominant colour analysis application 1022 may be a stand-alone application, a web browser plug-in, a part of a camera application, and/or part of a dedicated e-commerce application. The dominant colour analysis application 1022 may be configured to perform image analysis with respect to an image captured by the consumer device 1006 or downloaded to the consumer device 1006. The dominant colour analysis application 1022 may identify one or more dominant colours of an item identified within the image, and may present the one or more dominant colours on a graphical user interface displayed on the consumer device 1006.

The consumer device 1006 may further facilitate selection of one or more of the dominant colours displayed as part of generating a search query, where the selected one or more dominant colours form part of the search parameters. That search query may be transmitted to the ecommerce platform 1002 in some implementations, and may result in a search of the database 1008 to identify one or more product records 1010 that meet the search parameters. In particular, the results may include one or more product records 1010 that include product data and/or images having the selected one or more dominant colours, or having dominant colours within a set tolerance or range of the selected one or more dominant colours.

Figure 2A:
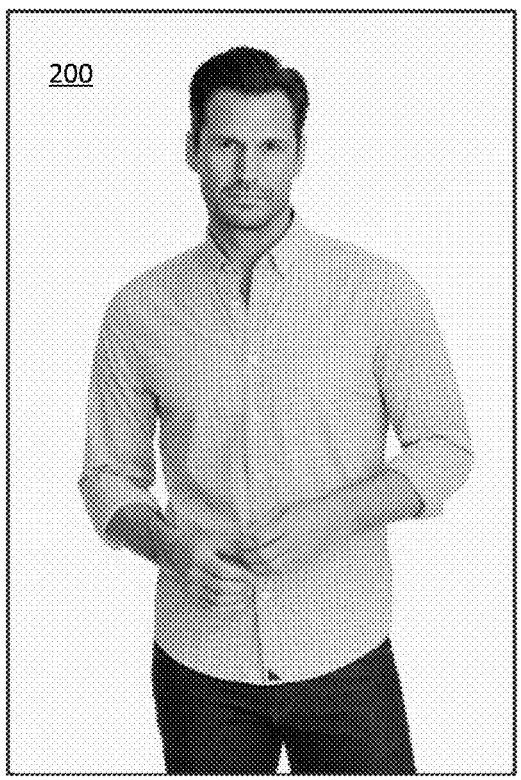
FIGS. 2A-2G illustrate dominant colour analysis with respect to an example image.
Figure 2B:
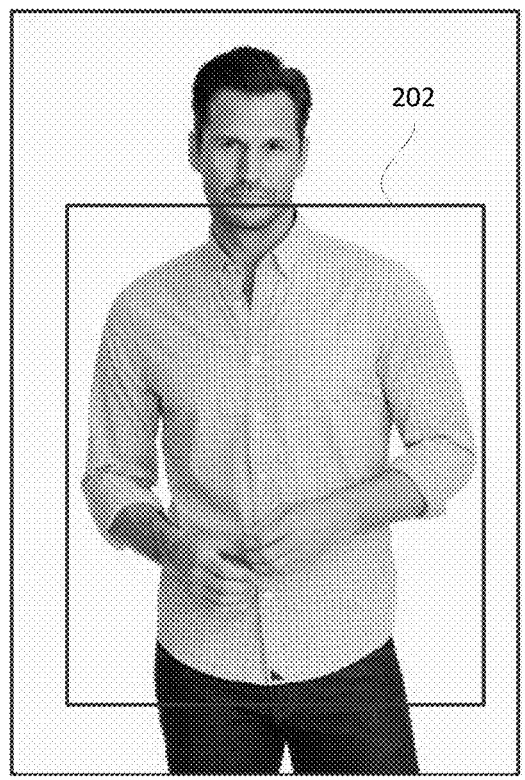
Figure 2C:
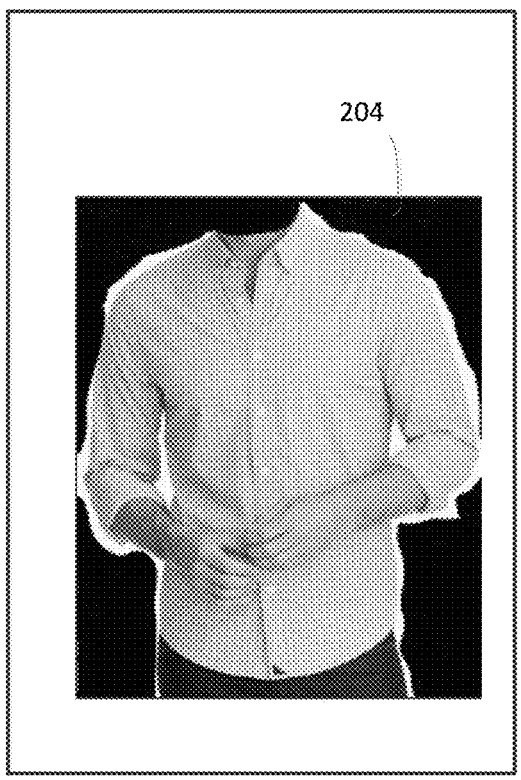
Figure 2D:
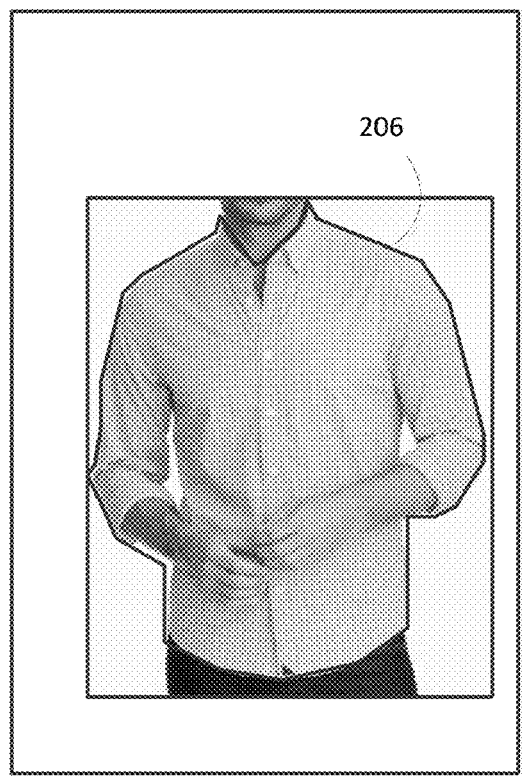
Figure 2E:
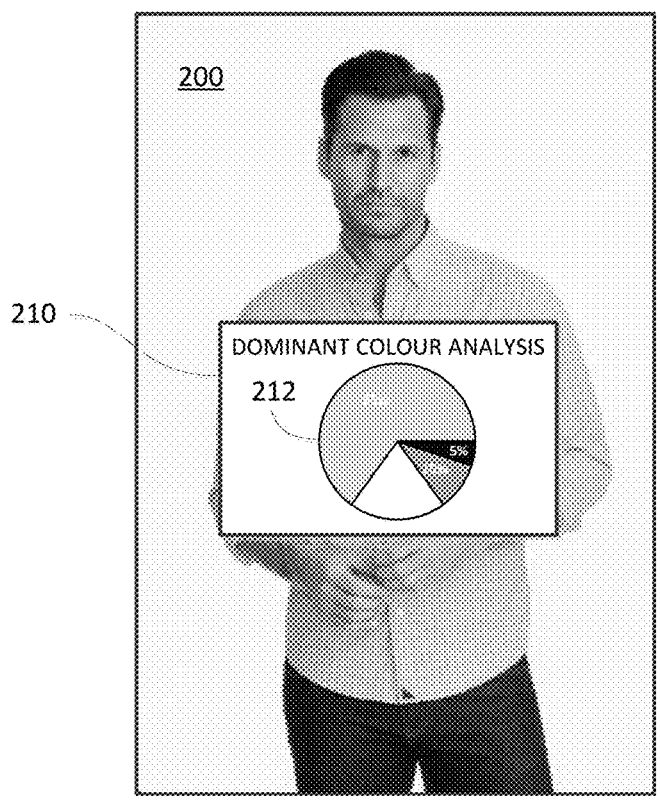

To illustrate by way of example, reference will now be made to FIGS. 2A-2G, which illustrate an example image analysis to determine dominant colour of a product, in conjunction with FIG. 3, which shows, in flowchart form, one example method 300 of determining one or more dominant colours associated with a product. The method 300 may be implemented by an e-commerce platform and, in particular, may be implemented by way of suitably-programmed software instructions stored in memory on a computing device which, when executed by one or more processors of the computing device, cause the computing device to carry out the described operations. In some implementations, the software instructions may be embodied in the dominant colour analysis application 1020 (FIG. 1). In some examples, the method 500 may be implemented by a user device, such as the consumer device 1006 (FIG. 1). The software instructions in such an example may be embodied in the dominant colour analysis application 1022 (FIG. 1).

The method 300 is applied in analysing an image. An example image 200 is shown in FIG. 2A. The image 200 contains one or more items, including an item-of-interest, which in this example is a men's shirt. As indicated by operation 302, the method 300 may include determining a product class with respect to the image depicting the item-of-interest. In some implementations, the product class may refer to a category or class of items to which the item belongs. Examples may include "apparel" or "clothing". In some cases, determining a product class may include determining a sub-class or more specific categories of items.

Examples may include "men's clothing", "shirts", "men's shirts", "men's collared shirts", "men's dress shirts", or other such categories or sub-categories.

The determination in operation 302 may be made based on a product class selection received through a user interface. For example, a user initiating the method 300 with respect to the image 200 may designate or select a product class. In some cases, the designation or selection may be through selecting one of a plurality of predefined product classes presented as options on a user interface. In some cases, the selection may be inferred on the basis that the image 200 is associated with the product class, for example through its metadata or through its storage in association with a product class, e.g. in a database folder or data structure associated with that product class. For example, if the method 300 is applied in determining dominant colour data for an image stored in the database 1008 (FIG. 1), the image may be stored in, or associated with, a product record 1010 (FIG. 1) that has a designated product class, subclass, or category. If the image is not in the database 1008 and/or has not yet been classified, then the operation 302 may be based on user input or on image analysis to identify the product class.

In some implementations, the determination in operation 302 may be based on an object detection operation with respect to the image 200. That is, the image may be analyzed using an object detection algorithm. The algorithm may be tuned to detect certain types of items in certain contexts. For instance, if implemented in connection with an e-commerce platform, the object detection algorithm may be tuned to identify products and not other items, like humans, natural objects (e.g. trees, etc.), animals, buildings, or infrastructure. The object detection algorithm may be further tuned to identify one or more principal items in an image of interest. For example, the example image 200 features a model wearing a shirt and pants. While a portion of the pants are visible in the image 200, the object detection algorithm may be configured to determine that the shirt, since it is entirely visible in the image 200 and relatively centered in the image 200, is the most probable object-of interest in the image 200.

In some implementations, the determination may in part be based on user input selecting a location in the image, e.g. a pinpoint, indicating at least one pixel or group of pixels relevant to the item of interest. The object detection algorithm may then center its analysis based on the selected pinpoint to identify the item of interest in the image 200.

In operation 304, a portion of the image may be identified or isolated containing the item-of interest. Based on the product class determined in operation 302 and/or the item detection operation for determining the product class, the portion of the image containing the item-of-interest may be identified or isolated. In one example, as shown in FIG. 2B, a bounding box 202 may be applied to designate the portion of the image 200 containing the item of interest, which in this example is the men's shirt. The item detection operation may determine edges or pixels associated with the item and the bounding box 202 dimensions and location may be determined to be of a minimum size that includes all edges or pixels associated with the item. In this illustration the bounding box 202 is rectangular, but in some other examples it may take other shapes. In some cases, the bounding box 202 may be used in a cropping operation to remove portions of the image 200 external to the bounding box 202.

The operation 304 may include other image transformations or alterations to isolate the item of interest or to remove some or all pixels irrelevant to the item of interest. As an example, a segmenting or masking operation may be applied to remove non-product portions of the image. An example illustration of a masking operation that removes non-product portions 204 of the image 200 is shown in FIG. 2C. In another example (not shown), the mask may be one designed to select portions of the item in the image rather than to mask non-item portions of the image. In some cases, multiple masks may be merged to isolate the item-of-interest. The masking operation may be instead of, or in addition to, the cropping operation.

In another example, the object detection algorithm may be applied in selecting or segmenting a portion of the image containing the item-of-interest. As noted above, the object detection algorithm may be configured to perform edge detection or other image analysis for identifying the boundaries of the item-of-interest in the image. A portion 206 of the image may be selected that contains at least the item-of-interest, as shown in FIG. 2D.

It will be appreciated that operation 304 may result in selection or identification of a portion of the image that includes the item-of-interest, or at least a substantial portion of the item-of-interest, and excludes parts of the image that are not part of the item-of-interest, or at least a substantial part of the image not containing the item-of-interest. It will further be appreciated that in some cases, a sub-portion of the selected portion may contain elements that are not the item-of-interest, such as the model's forearms and hands in the illustrated example.

In some cases, operations 302 and 304 may be the same operation or may be performed substantially simultaneously or in an alternate order. Various machine learning models may be used in identifying and isolating the object-of-interest. In some implementations, separate machine learning models are used for different product classes, such that those machine learning models are tuned and trained to identify and mask specific classes of items, such as "clothing" or "appliances". In some cases, multiple machine learning models may be available in a class and the selected machine learning model for a particular image may be based on the subclass, such as "shoes", "shirts" or "dishwashers".

In operation 306, a colour space (e.g. the RGB colour space in some examples) or colour model is partitioned into a plurality of ranges. The size of the ranges may be dependent upon a resolution parameter. The resolution parameter may indicate the degree to which the colour data is quantized in determining the dominant colour. That is, the resolution parameter may be selected to produce coarse or fine distinctions between colours in the colour space. The resolution parameter may be pre-set, may be programmable, or may be selected by a user. Each range may be associated with a representative colour value and a range of colours around that colour value that are quantized to that representative colour value. In some implementations, the representative colour value is the colour value at the center of the range. The finer the resolution, the more ranges and representative colours into which the colour space is partitioned. Operation 306 may be performed after operations 302 and 304 or prior to them. The ranges and representative colours may be preset based on a predefined partitioning of the colour space. In some cases, the partitioning is not uniform. That is, in some cases, the partitioning may be biased to create finer distinction in colour for certain bands of colour that are more common and more coarse distinction in colour for bands of colour that are less common. In some cases, the colour space and its partitioning are specific to a product class. For example, the class "appliances" may have a more limited colour space in which black, white, grey, stainless steel, and a small subset of other colours are most common, whereas the class "shirts" may have a large range of possible colours and combinations of colours.

In operation 308, the colours within the portion of the image are analyzed and classified according to the partitioned colour space. In particular, the colour value(s) assigned to pixels within the portion of the image are determined and grouped into their respective ranges based on the partitioning of the colour space. That is, for each pixel in the portion, its colour value determines into which range it falls and a count of pixels in that range is incremented. In this manner, the operation 308 determines how many pixels in the portion fall into each of the colour ranges. In some cases, the determination of counts in each range may be based on identifying a set of representative colours based on the partitioning and resolution parameter, and then incrementing a count for the representative colour nearest to the colour value of a pixel. A clustering or nearest neighbour algorithm may be used for identifying the representative colour closest in value to the pixel's colour value. In some implementations, a k-means clustering operation is applied to determine the counts of pixels associated with each of the representative colours or colour ranges. Irrespective of the approach, operation 308 results in a count of pixels in the portion of the image associated with each representative colour or each colour range. It will be appreciated that references herein to "colour value" may include colour schemes in which colours are represented by multiple values or parameters, such as RGB, or a single consolidated colour value, like HEX. The colour space may be multidimensional in some cases, and the distance metric for classifying colours may involve a multi-dimensional distance calculation.

In operation 310, the representative colours/colour ranges are ranked based on the counts determined in operation 308. In operation 312, the representative colour (or colour range) with the highest count of pixels is identified as the dominant colour of the item in the image. In some implementations more than one dominant colour may be identified.

In one example, the determination of dominant colours is partly based on relative counts. That is, if one colour is more than a threshold percentage (or other value) larger than the next-highest count, then that one colour is strongly dominant and may be identified as the sole dominant colour. The threshold percentage may be 50%, 80%, 95% or some other value indicative of dominance. If two or more of the highest count colours are within a certain percentage of each other (e.g. 5%, 10%, 15%, etc.) then the item may be identified as a multi-colour item having two or more dominant colours. In some cases, all colours having at least a minimum percentage of the count of pixel colours may be identified as dominant colours.

Operation 312 may further include outputting the dominant colour data. Data indicating the degree of dominance may be output in association with the dominant colour data. The dominant colour data may be visually displayed on a user interface. For example, as shown in FIG. 2E, an overlay 210 atop the image 200 may be displayed. The overlay 210 may show one or more of the dominant colours determined in operations 308 and 310. The overlay 210 may be designed so as to display, numerically, textually, or graphically, the relative dominance of each of the dominant colours displayed. In this example, the overlay 210 shows a pie chart 212 graphically illustrating the dominant colour data. In some cases, the "slices" of the pie chart may be selectable. Selecting a slice corresponding to a specific dominant colour may provide details regarding the selected colour data. In one example, the displayed data may indicate a measure of deviation of pixel colour values within the range corresponding to that representative colour. In some cases, selection of the slice may initiate a search query that includes that representative colour as a search parameter, as will be described later below.

Figure 2F:
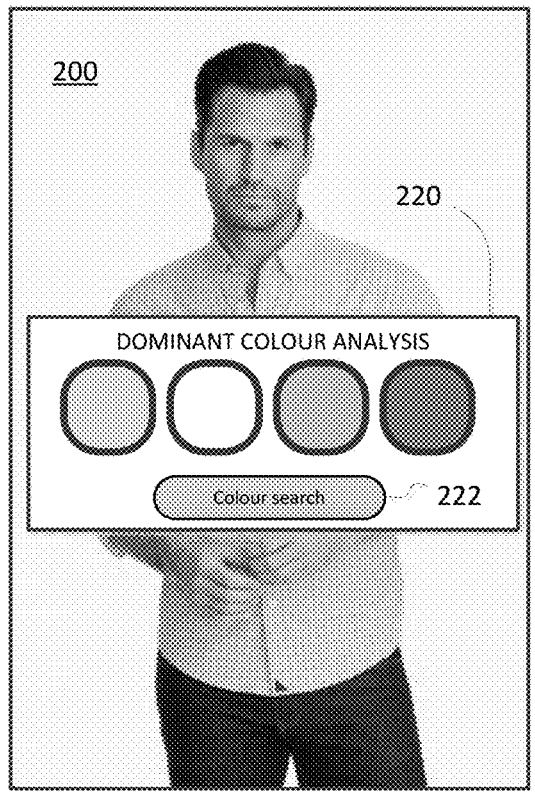
Figure 3:
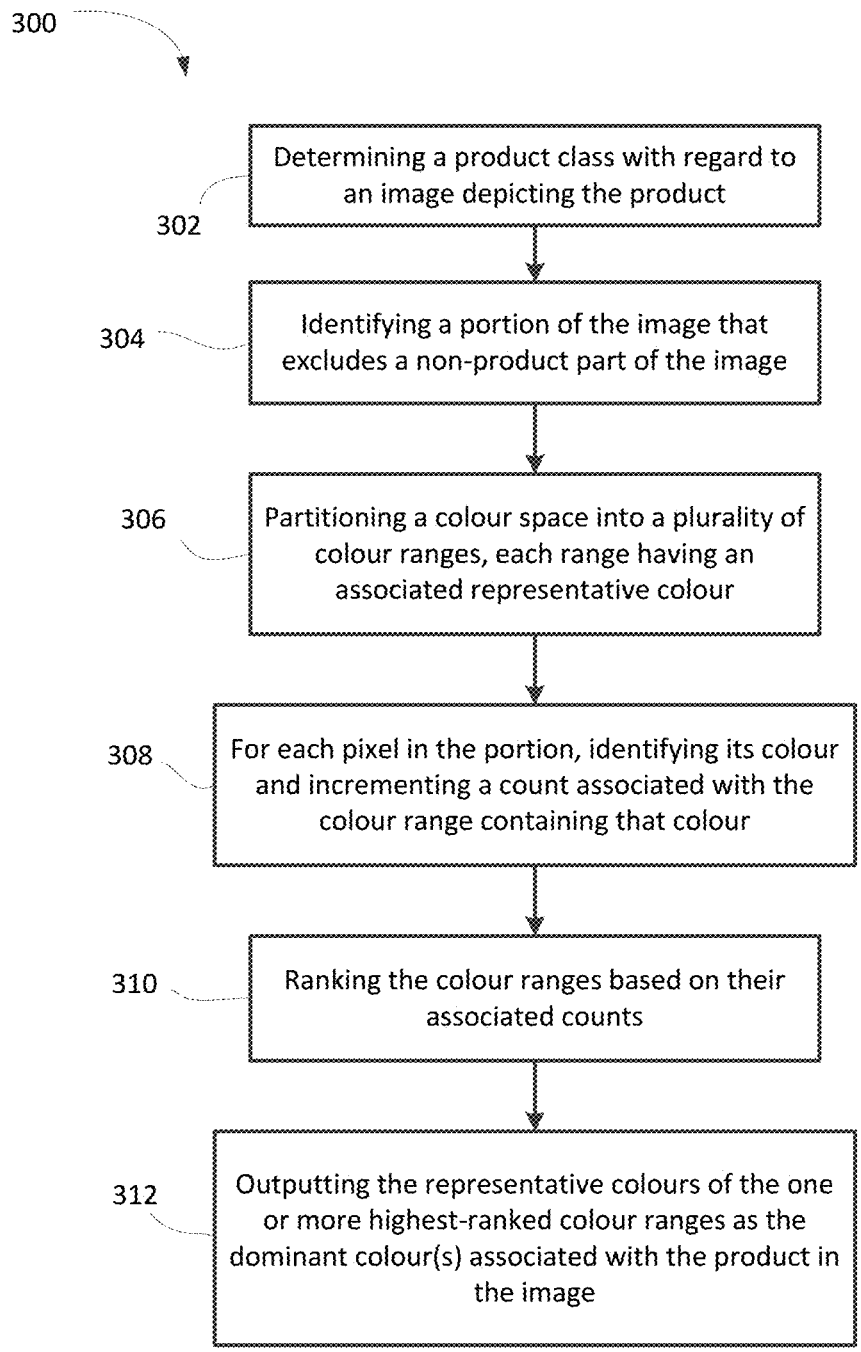
FIG. 3 is shows, in flowchart form, one simplified example method for determining dominant colour data for an image.

Another example interface is shown in FIG. 2F, which shows an alternative overlay 220. Although shown as being overlaid atop the image 200, in other implementations, the data may be displayed in a widget or other graphical element elsewhere on the interface, such as in a side panel, bottom ribbon, or elsewhere. The alternative overlay 220 in this example does not display the relative dominance of the dominant colours shown. It may be configured to show the one, two, three or more most-dominant colours in order from left-to-right (or top-to-bottom in another example). The displayed colours may be selectable to cause display of additional information or to initiate a search operation. In some cases, a separate search button 222 or link may be displayed.

Figure 2G:
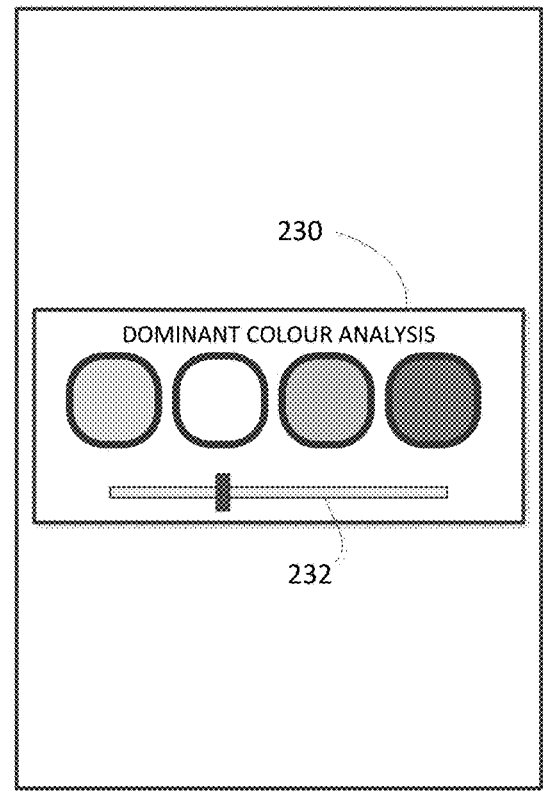

In yet another example, the resolution parameter may be adjustable by a user. That is, the user may be able to change the resolution of the dominant colour analysis. In one example, it may be toggled between a "fine" resolution and a "course" resolution. In another example, a resolution parameter may be selected in a range of possible resolution parameters that reflect a gradual change in the number of possible representative colours and, relatedly, the number and size of the colour ranges. Referring to FIG. 2G, a user interface 230 may be displayed on a user device to visually output the results of the dominant colour analysis. The user interface 230 may provide an adjustment widget, which in this example is a slider 232. Other graphical elements may be used to enable the receipt of user input to adjust the resolution parameter.

Through actuating the slider 232 or otherwise inputting a change to the resolution parameter, the user device may change the displayed dominant colour data in the interface 230 to reflect any resultant change in the dominant colour analysis. In some cases, an adjustment to the slider 232 changes the resolution parameter and, as a result, operations 306, 308, and 310 are re-performed with the new resolution parameter to obtain new dominant colour data results. In other words, selection of an updated resolution parameter causes a dynamic change in the representative colour values/ranges and recalculation of the dominant colour counts. In another implementation, the method 300 is initially performed with each of a range of possible resolution parameters to generate a set of dominant colour data results for each possible resolution parameter setting. When a new resolution parameter is selected through the user interface, for example using the slider 232, the resultant dominant colour data associated with the new setting may be retrieved from memory and the display on the interface 230 is updated accordingly.

As an illustrative example, if the men's shirt in the image 200 is a pattern composed of two or more shades of blue and a bit of white, the model's arms and neck are generally flesh tones, and the pants are a dark grey, then the initial dominant colour results displayed may generally show a representative blue colour as the dominant colour. It may be strongly dominant as blue tones dominate the portion of the image. The secondary dominant colours may include white (from the shirt and the bit of background in the portion of the image), dark grey, and/or a flesh tone. If the resolution parameter is changed to a finer resolution, the resultant analysis may identify the dominant colours as two or more shades of blue, resulting in an interface that shows the two more shades of blue as a primary dominant colour and one or more secondary dominant colours.

Various image pre-processing operations may be applied either to the image or the portion of the image prior to the dominant colour analysis to try to compensate for lighting artefacts, shadows or highlights due to materials folds, or other such elements that may produce the appearance of shifts in the item colour.

The above-described determination of dominant colour(s) associated with an item in an image may be output to a display screen to enable selection of one or more of the dominant colour for use in a product search, as described in connection with FIG. 2F. In some instances, the above-described determination of dominant colour(s) associated with an item in an image may be used in tagging or associating the image with one or more dominant colour values. In some cases, a product record with which the image is associated may be tagged or associated with the dominant colour data. In some cases, dominant colour data from two or more images of an item is collated and/or averaged and/or otherwise combined to produce product dominant colour data, which is then stored in association with a product record.

The object detection and/or masking/isolation operations may be performed, wholly or in part, by a machine learning model in some implementations. In some cases, separate machine learning models may be used for different product classes or sub-classes. In some cases, various machine learning models for different categories or sub-categories of products are stored at the e-commerce platform. In some cases, a selected one of the models may be sent to a user device for use at the user device in identifying dominant colours of an item in an image. In some cases, the image may be transmitted from the user device to the e-commerce platform where the analysis is performed, and dominant colour data results may be transmitted back to the user device for display thereon.

Figure 4:
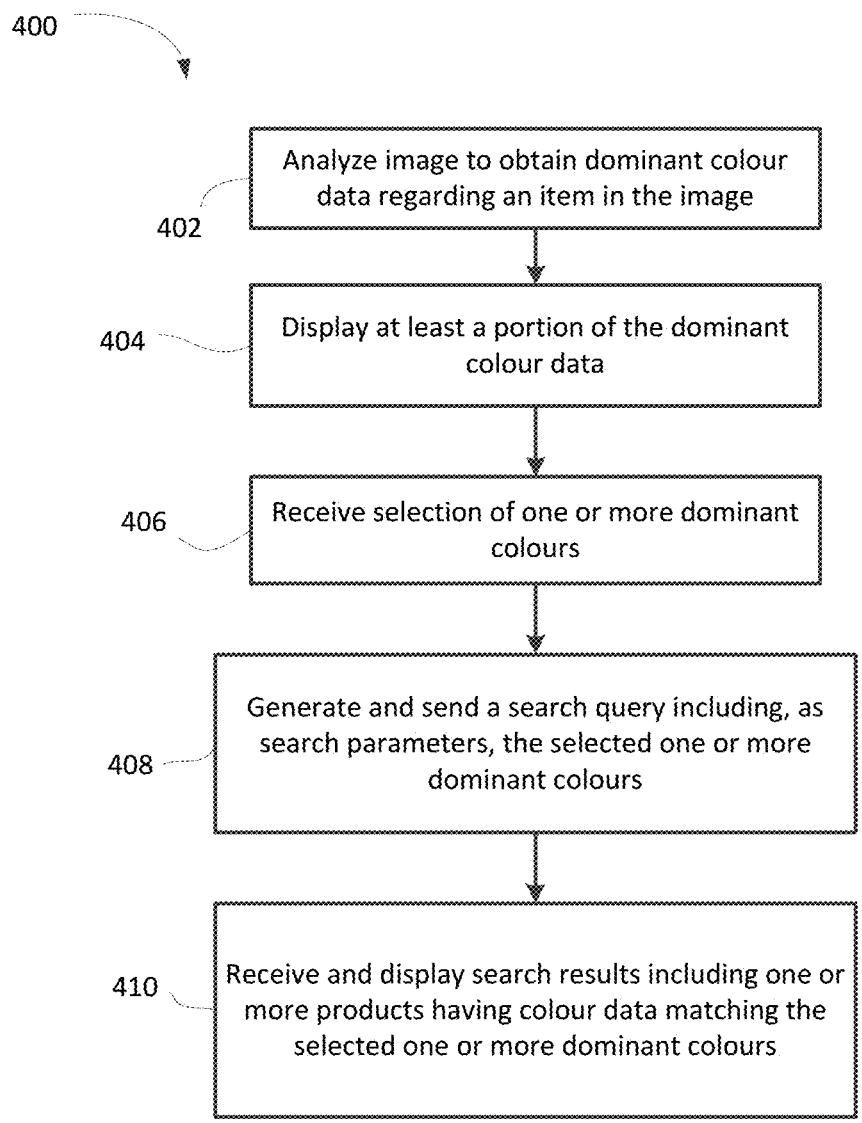
FIG. 4 shows, in flowchart form, one simplified example method for generating a colour-based search.

Reference is now made to FIG. 4, which shows, in flowchart form, one example method 400 for colour-based searching. In some example implementations, the method 400 may be implemented by the customer device 1006 (FIG. 1), or partly by the customer device 1006 and by the e-commerce platform 1002 (FIG. 1). The method 400 may be implemented by way of processor-executable software instructions stored in memory that, when executed by one or more processors, causes the one or more processor to carry out the operations of the method 400.

The method 400 may be carried out with respect to an image featuring an item of interest. The image may be an image obtained by a camera within a user device in some cases. The image may be obtained from a third party website, social media feed, file sharing service, email, instant message, or other such sources. The image may be obtained from an e-commerce platform in some cases. In operation 402, the image is analyzed to determine the dominant colour data for the image. In particular, the image may be analyzed to determine the dominant colour data for an item-of-interest in the image. The item-of-interest may be determined using object detection in some cases. In some cases, a user input may identify the item-of-interest by pinpoint on the image and/or by selection of a product type or class. In some cases, the item-of-interest may be inferred from contextual data, such as an image filename, image metadata, or location from where the image was obtained. Similarly, the product class or category may be determined based on user input, image metadata, image context, device context, or other such sources of data.

The determination of dominant colour data may employ a method such as the method 300 (FIG. 3) described above. The dominant colour data for the item in the image may be displayed on a display screen in operation 404. The display may include one or more dominant colours. In some cases, the display may include colour names in text form. The colour names may be determined from a mapping between dominant colour values and a taxonomy of colours. The taxonomy may be a standardized taxonomy, such as Pantone™, or a custom taxonomy specific to a merchant. In some cases, the display includes a primary dominant colour and one or more secondary dominant colours. In some cases, the display may include a resolution adjustment mechanism for dynamically changing the resolution of the dominant colour analysis being displayed.

In operation 406, the user device may receive selection of one or more dominant colours. The colours may be selected using a touchscreen or other input device and the displayed dominant colour data in some cases. In some cases, the display of dominant colour data may include an option to generate a search. Once selected, a search interface may be displayed that may include the option of selecting one or more of the dominant colours identified in operation 402.

Selection of the one or more dominant colours, or initiation of a colour-based search in another manner, may include input of other search parameters. As an example, the search may be initiated in the context of browsing a particular product subcategory, in which case the initial search parameters may be for products in that subcategory. This may be editable in the search interface. In some cases, the product category is initially set to the same category as determined for the item-of-interest in the image. In some cases, the search interface may provide a list of related items associated with the item of interest and user input may be received selecting one of the related items as a product category or sub-category.

The search user interface may further provide for input regarding whether the selected dominant colour is to be a primary or secondary colour in the search results. That is, the user interface that provides for selection of one of the dominant colours may enable the user to indicate whether the item sought features that selected colour as its primary dominant colour or as a secondary dominant colour. For example, the image containing the item of interest may be a patterned men's dress shirt containing a primary dominant colour such as a certain shade of blue and two or more secondary dominant colours, such as white and a shade of orange. A search may be initiated for a tie including selection of the secondary dominant colour orange as its primary dominant colour. Conversely, a search may be initiated for a tie that includes the certain shade of blue as its secondary dominant colour. Additional search parameters may also be input through the user interface. In some cases, the additional search parameters may be text input, i.e. descriptors. In some cases, the additional search parameters may include selection of one or more additional colours, either part of the dominant colour results or not part of the dominant colour results. In the latter case, the user interface may provide a graphical colour palette for selection of colour values.

In some cases, the colour search interface may provide for a tunable match parameter indicative of the maximum distance of search results from the colour values of the search parameters to be considered a match. The smaller the distance, the more exact the colour match needs to be to be considered a valid search result.

In operation 408 a search query is generated based on the selected one or more dominant colours and any additional search parameters specified. That search query is transmitted from the user device to a database such as the ecommerce platform. The ecommerce platform, or another database platform, searches within its product database for product records and/or product images matching the specified search parameters. This includes identifying matches between the specified one or more dominant colours and colour data for the product records or product images. That is, the images or the records may be tagged with dominant colour data, which may include a specified dominant colour and one or more secondary dominant colours. The colour data may include a score or value indicating the degree of dominance.

The images or records in the database may have been tagged using the same dominant image analysis described above. In some cases, the images may be tagged with colour information by a merchant, user, or other third party that provided or create the image. In some cases, one or more of the images may be analyzed in real-time during the search query to determine its dominant colour data and to tag it accordingly.

Results from the search are then received by the user device and displayed, as indicated by operation 410. The results include one or more product items matching the search query parameters, including the dominant colour search parameters specified in the search query.

The method 400 may be implemented within an e-commerce application, a browser, or in another application on the user device. In some cases, the user device may transmit the image to the e-commerce platform for dominant colour analysis and may receive the dominant colour data results in reply. In some cases, the user device may perform the dominant colour analysis on the image and may display the results it obtains. In some cases the user device may transmit the image or data regarding the product class or subclass, and the e-commerce platform may retrieve and transmit a machine learning model tuned to the product class or subclass for use by the user device in determining the dominant colour data for the item-of-interest in the image.

In any of the above-described example methods or processes it will be understood that certain operations described as occurring in sequence may be implemented in a different sequence or carried out in parallel without impacting the overall functioning of the method or process.

Figure 5:
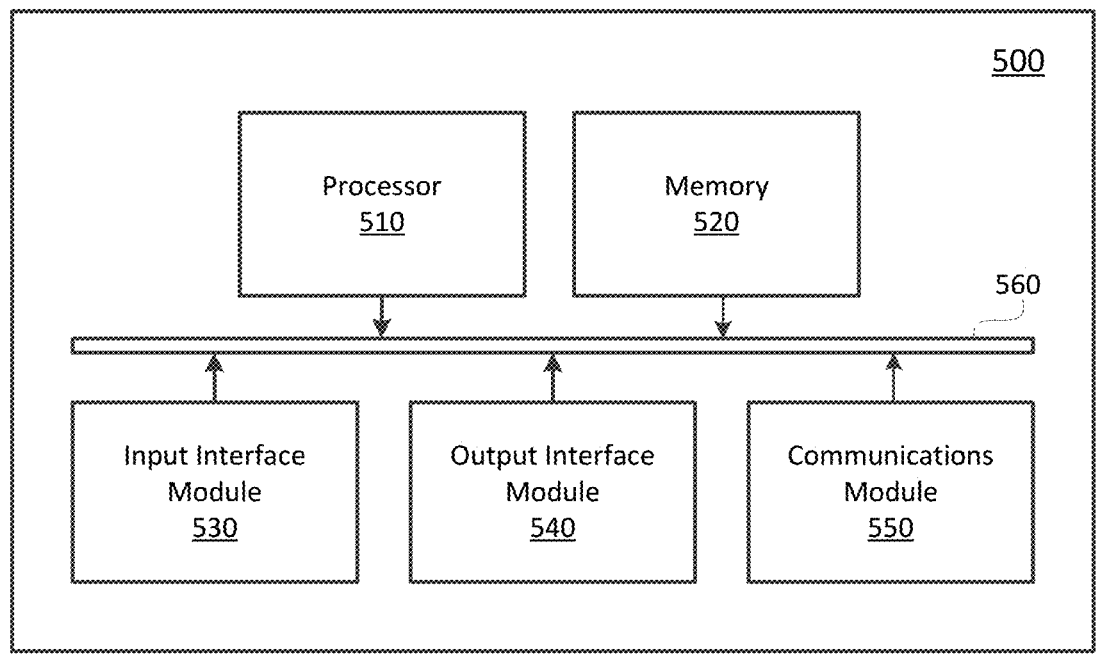
FIG. 5 is a high-level schematic diagram of a computing device.

Many of the above-described methods may be implemented by way of suitably-programmed computing device. FIG. 5 is a high-level diagram of an example computing device 500. The example computing device 500 includes a variety of modules. For example, the example computing device 500 may include a processor 510, a memory 520, an input interface module 530, an output interface module 540, and a communications module 550. As illustrated, the foregoing example modules of the example computing device 500 are in communication over a bus 560.

The processor 510 is a hardware processor. The processor 510 may, for example, be one or more ARM, Intel x86, PowerPC processors, or the like.

The memory 520 allows data to be stored and retrieved. The memory 520 may include, for example, random access memory, read-only memory, and persistent storage. Persistent storage may be, for example, flash memory, a solid-state drive or the like. Read-only memory and persistent storage are a computer-readable medium. A computer-readable medium may be organized using a file system such as may be administered by an operating system governing overall operation of the example computing device 500.

The input interface module 530 allows the example computing device 500 to receive input signals. Input signals may, for example, correspond to input received from a user. The input interface module 530 may serve to interconnect the example computing device 500 with one or more input devices. Input signals may be received from input devices by the input interface module 530. Input devices may, for example, include one or more of a touchscreen input, keyboard, trackball or the like. In some embodiments, all or a portion of the input interface module 530 may be integrated with an input device. For example, the input interface module 530 may be integrated with one of the aforementioned example input devices.

The output interface module 540 allows the example computing device 500 to provide output signals. Some output signals may, for example, allow provision of output to a user. The output interface module 540 may serve to interconnect the example computing device 500 with one or more output devices. Output signals may be sent to output devices by output interface module 540. Output devices may include, for example, a display screen such as, for example, a liquid crystal display (LCD), a touchscreen display. Additionally, or alternatively, output devices may include devices other than screens such as, for example, a speaker, indicator lamps (such as, for example, light-emitting diodes (LEDs)), and printers. In some embodiments, all or a portion of the output interface module 540 may be integrated with an output device. For example, the output interface module 540 may be integrated with one of the aforementioned example output devices.

The communications module 550 allows the example computing device 500 to communicate with other electronic devices and/or various communications networks. For example, the communications module 550 may allow the example computing device 500 to send or receive communications signals. Communications signals may be sent or received according to one or more protocols or according to one or more standards. For example, the communications module 550 may allow the example computing device 500 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally, or alternatively, the communications module 550 may allow the example computing device 500 to communicate using near-field communication (NFC), via Wi-Fi™, using Bluetooth™ or via some combination of one or more networks or protocols. Contactless payments may be made using NFC. In some embodiments, all or a portion of the communications module 550 may be integrated into a component of the example computing device 500. For example, the communications module may be integrated into a communications chipset.

Software comprising instructions is executed by the processor 510 from a computer-readable medium. For example, software may be loaded into random-access memory from persistent storage of memory 520. Additionally, or alternatively, instructions may be executed by the processor 510 directly from read-only memory of the memory 520.

Figure 6:
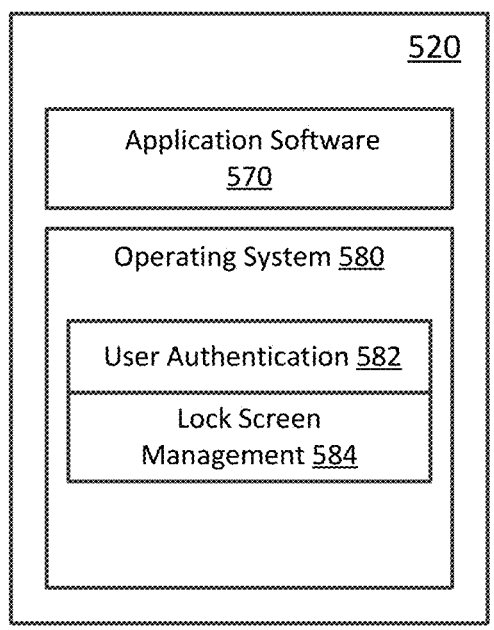
FIG. 6 shows a simplified organization of software components stored in a memory of the computing device of FIG. 5.

FIG. 6 depicts a simplified organization of software components stored in memory 520 of the example computing device 500. As illustrated, these software components include, at least, application software 570 and an operating system 580.

The application software 570 adapts the example computing device 500, in combination with the operating system 580, to operate as a device performing a particular function. While a single application software 570 is illustrated in FIG.

6, in operation, the memory 520 may include more than one application software and different application software may perform different operations.

The operating system 580 is software. The operating system 580 allows the application software 570 to access the processor 510, the memory 520, the input interface module 530, the output interface module 540 and the communications module 550. The operating system 580 may, for example, be iOS™, Android™, Linux™, Microsoft Windows™, or the like.

The operating system 580 provides various system services for the example computing device 500. User authentication services 582 includes a suite of services relating to credential enrollments and authentication of device users. For example, user authentication services 582 may include initial enrollment of credentials (e.g., PIN, pattern, password, or the like), credentials management, and processing of authentication tokens. Lock screen management services 584 relate to enabling, disabling, and modifying lock screens on the example computing device 500, and may include graphical user interface (GUI) control, display management, user input processing, and device unlock support.

One or more of the computing devices 500 may be used to implement the e-commerce platform 1002 (FIG. 1) in some examples. The consumer device 1006 (FIG. 1) may be implemented by the computing device 500 in some cases.

Example E-Commerce Platform

Although integration with a commerce platform is not required, in some embodiments, the methods disclosed herein may be performed on or in association with a commerce platform such as an e-commerce platform. Therefore, an example of a commerce platform will be described.

Figure 7:
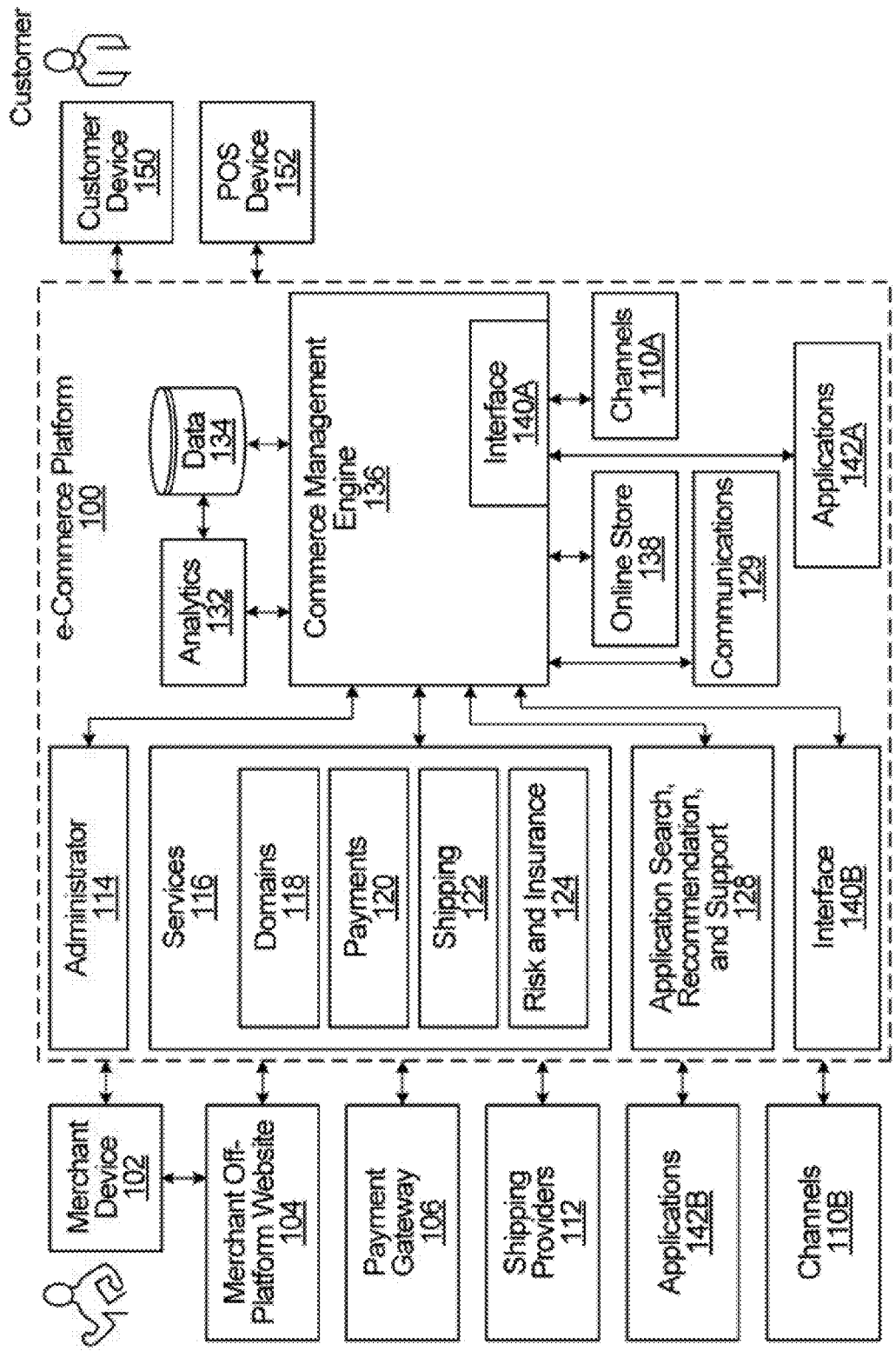
FIG. 7 is a block diagram of an e-commerce platform, in accordance with an example embodiment.

FIG. 7 illustrates an example e-commerce platform 100, according to one embodiment. The e-commerce platform 100 may be exemplary of the e-commerce platform described with reference to FIG. 1. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including, for example, physical products, digital content (e.g., music, videos, games), software, tickets, subscriptions, services to be provided, and the like.

While the disclosure throughout contemplates that a "merchant" and a "customer" may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to "merchants" and "customers", and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, consumer, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like. Furthermore, it may be recognized that while a given user may act in a given role (e.g., as a merchant) and their associated device may be referred to accordingly (e.g., as a merchant device) in one context, that same individual may act in a different role in another context (e.g., as a customer) and that same or another associated device may be referred to accordingly (e.g., as a customer device). For example, an individual may be a merchant for one type of product (e.g., shoes), and a customer/consumer of other types of products (e.g., groceries). In another example, an individual may be both a consumer and a merchant of the same type of product. In a particular example, a merchant that trades in a particular category of goods may act as a customer for that same category of goods when they order from a wholesaler (the wholesaler acting as merchant).

The e-commerce platform 100 provides merchants with online services/facilities to manage their business. The facilities described herein are shown implemented as part of the platform 100 but could also be configured separately from the platform 100, in whole or in part, as stand-alone services. Furthermore, such facilities may, in some embodiments, may, additionally or alternatively, be provided by one or more providers/entities.

In the example of FIG. 7, the facilities are deployed through a machine, service or engine that executes computer software, modules, program codes, and/or instructions on one or more processors which, as noted above, may be part of or external to the platform 100. Merchants may utilize the e-commerce platform 100 for enabling or managing commerce with customers, such as by implementing an e-commerce experience with customers through an online store 138, applications 142A-B, channels 110A-B, and/or through point-of-sale (POS) devices 152 in physical locations (e.g., a physical storefront or other location such as through a kiosk, terminal, reader, printer, 3D printer, and the like).

A merchant may utilize the e-commerce platform 100 as a sole commerce presence with customers, or in conjunction with other merchant commerce facilities, such as through a physical store (e.g., "brick-and-mortar" retail stores), a merchant off-platform website 104 (e.g., a commerce Internet website or other internet or web property or asset supported by or on behalf of the merchant separately from the e-commerce platform 100), an application 142B, and the like. However, even these "other" merchant commerce facilities may be incorporated into or communicate with the e-commerce platform 100, such as where POS devices 152 in a physical store of a merchant are linked into the e-commerce platform 100, where a merchant off-platform website 104 is tied into the e-commerce platform 100, such as, for example, through "buy buttons" that link content from the merchant off platform website 104 to the online store 138, or the like.

The online store 138 may represent a multi-tenant facility comprising a plurality of virtual storefronts. In embodiments, merchants may configure and/or manage one or more storefronts in the online store 138, such as, for example, through a merchant device 102 (e.g., computer, laptop computer, mobile computing device, and the like), and offer products to customers through a number of different channels 110A-B (e.g., an online store 138; an application 142A-B; a physical storefront through a POS device 152; an electronic marketplace, such, for example, through an electronic buy button integrated into a website or social media channel such as on a social network, social media page, social media messaging system; and/or the like). A merchant may sell across channels 110A-B and then manage their sales through the e-commerce platform 100, where channels 110A may be provided as a facility or service internal or external to the e-commerce platform 100. A merchant may, additionally or alternatively, sell in their physical retail store, at pop ups, through wholesale, over the phone, and the like, and then manage their sales through the e-commerce platform 100. A merchant may employ all or any combination of these operational modalities. Notably, it may be that by employing a variety of and/or a particular combination of modalities, a merchant may improve the probability and/or volume of sales. Throughout this disclosure the terms online store 138 and storefront may be used synonymously to refer to a merchant's online e-commerce service offering through the e-commerce platform 100, where an online store 138 may refer either to a collection of storefronts supported by the e-commerce platform 100 (e.g., for one or a plurality of merchants) or to an individual merchant's storefront (e.g., a merchant's online store).

In some embodiments, a customer may interact with the platform 100 through a customer device 150 (e.g., computer, laptop computer, mobile computing device, or the like), a POS device 152 (e.g., retail device, kiosk, automated (self-service) checkout system, or the like), and/or any other commerce interface device known in the art. The e-commerce platform 100 may enable merchants to reach customers through the online store 138, through applications 142A-B, through POS devices 152 in physical locations (e.g., a merchant's storefront or elsewhere), to communicate with customers via electronic communication facility 129, and/or the like so as to provide a system for reaching customers and facilitating merchant services for the real or virtual pathways available for reaching and interacting with customers.

In some embodiments, and as described further herein, the e-commerce platform 100 may be implemented through a processing facility. Such a processing facility may include a processor and a memory. The processor may be a hardware processor. The memory may be and/or may include a non-transitory computer-readable medium. The memory may be and/or may include random access memory (RAM) and/or persisted storage (e.g., magnetic storage). The processing facility may store a set of instructions (e.g., in the memory) that, when executed, cause the e-commerce platform 100 to perform the e-commerce and support functions as described herein. The processing facility may be or may be a part of one or more of a server, client, network infrastructure, mobile computing platform, cloud computing platform, stationary computing platform, and/or some other computing platform, and may provide electronic connectivity and communications between and amongst the components of the e-commerce platform 100, merchant devices 102, payment gateways 106, applications 142A-B, channels 110A-B, shipping providers 112, customer devices 150, point-of-sale devices 152, etc. In some implementations, the processing facility may be or may include one or more such computing devices acting in concert. For example, it may be that a plurality of co-operating computing devices serves as/to provide the processing facility. The e-commerce platform 100 may be implemented as or using one or more of a cloud computing service, software as a service (SaaS), infrastructure as a service (IaaS), platform as a service (PaaS), desktop as a service (DaaS), managed software as a service (MSaaS), mobile backend as a service (MBaaS), information technology management as a service (ITMaaS), and/or the like. For example, it may be that the underlying software implementing the facilities described herein (e.g., the online store 138) is provided as a service, and is centrally hosted (e.g., and then accessed by users via a web browser or other application, and/or through customer devices 150, POS devices 152, and/or the like). In some embodiments, elements of the e-commerce platform 100 may be implemented to operate and/or integrate with various other platforms and operating systems.

In some embodiments, the facilities of the e-commerce platform 100 (e.g., the online store 138) may serve content to a customer device 150 (using data 134) such as, for example, through a network connected to the e-commerce platform 100. For example, the online store 138 may serve or send content in response to requests for data 134 from the customer device 150, where a browser (or other application) connects to the online store 138 through a network using a network communication protocol (e.g., an internet protocol). The content may be written in machine readable language and may include Hypertext Markup Language (HTML), template language, JavaScript, and the like, and/or any combination thereof.

In some embodiments, online store 138 may be or may include service instances that serve content to customer devices and allow customers to browse and purchase the various products available (e.g., add them to a cart, purchase through a buy-button, and the like). Merchants may also customize the look and feel of their website through a theme system, such as, for example, a theme system where merchants can select and change the look and feel of their online store 138 by changing their theme while having the same underlying product and business data shown within the online store's product information. It may be that themes can be further customized through a theme editor, a design interface that enables users to customize their website's design with flexibility. Additionally, or alternatively, it may be that themes can, additionally or alternatively, be customized using theme-specific settings such as, for example, settings as may change aspects of a given theme, such as, for example, specific colours, fonts, and pre-built layout schemes. In some implementations, the online store may implement a content management system for website content. Merchants may employ such a content management system in authoring blog posts or static pages and publish them to their online store 138, such as through blogs, articles, landing pages, and the like, as well as configure navigation menus. Merchants may upload images (e.g., for products), video, content, data, and the like to the e-commerce platform 100, such as for storage by the system (e.g., as data 134). In some embodiments, the e-commerce platform 100 may provide functions for manipulating such images and content such as, for example, functions for resizing images, associating an image with a product, adding and associating text with an image, adding an image for a new product variant, protecting images, and the like.

As described herein, the e-commerce platform 100 may provide merchants with sales and marketing services for products through a number of different channels 110A-B, including, for example, the online store 138, applications 142A-B, as well as through physical POS devices 152 as described herein. The e-commerce platform 100 may, additionally or alternatively, include business support services 116, an administrator 114, a warehouse management system, and the like associated with running an on-line business, such as, for example, one or more of providing a domain registration service 118 associated with their online store, payment facility 120 for facilitating transactions with a customer, shipping services 122 for providing customer shipping options for purchased products, fulfillment services for managing inventory, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may be configured with shipping services 122 (e.g., through an e-commerce platform shipping facility or through a third-party shipping carrier), to provide various shipping-related information to merchants and/or their customers such as, for example, shipping label or rate information, real-time delivery updates, tracking, and/or the like.

FIG. 8 depicts a non-limiting embodiment for a home page of an administrator 114. The administrator 114 may be referred to as an administrative console and/or an administrator console. The administrator 114 may show information about daily tasks, a store's recent activity, and the next steps a merchant can take to build their business. In some embodiments, a merchant may log in to the administrator 114 via a merchant device 102 (e.g., a desktop computer or mobile device), and manage aspects of their online store 138, such as, for example, viewing the online store's 138 recent visit or order activity, updating the online store's 138 catalog, managing orders, and/or the like. In some embodiments, the merchant may be able to access the different sections of the administrator 114 by using a sidebar, such as the one shown on FIG. 8. Sections of the administrator 114 may include various interfaces for accessing and managing core aspects of a merchant's business, including orders, products, customers, available reports and discounts. The administrator 114 may, additionally or alternatively, include interfaces for managing sales channels for a store including the online store 138, mobile application(s) made available to customers for accessing the store (Mobile App), POS devices, and/or a buy button. The administrator 114 may, additionally or alternatively, include interfaces for managing applications (apps) installed on the merchant's account; and settings applied to a merchant's online store 138 and account. A merchant may use a search bar to find products, pages, or other information in their store.

More detailed information about commerce and visitors to a merchant's online store 138 may be viewed through reports or metrics. Reports may include, for example, acquisition reports, behavior reports, customer reports, finance reports, marketing reports, sales reports, product reports, and custom reports. The merchant may be able to view sales data for different channels 110A-B from different periods of time (e.g., days, weeks, months, and the like), such as by using drop-down menus. An overview dashboard may also be provided for a merchant who wants a more detailed view of the store's sales and engagement data. An activity feed in the home metrics section may be provided to illustrate an overview of the activity on the merchant's account. For example, by clicking on a "view all recent activity" dashboard button, the merchant may be able to see a longer feed of recent activity on their account. A home page may show notifications about the merchant's online store 138, such as based on account status, growth, recent customer activity, order updates, and the like. Notifications may be provided to assist a merchant with navigating through workflows configured for the online store 138, such as, for example, a payment workflow, an order fulfillment workflow, an order archiving workflow, a return workflow, and the like.

The e-commerce platform 100 may provide for a communications facility 129 and associated merchant interface for providing electronic communications and marketing, such as utilizing an electronic messaging facility for collecting and analyzing communication interactions between merchants, customers, merchant devices 102, customer devices 150, POS devices 152, and the like, to aggregate and analyze the communications, such as for increasing sale conversions, and the like. For instance, a customer may have a question related to a product, which may produce a dialog between the customer and the merchant (or an automated processor-based agent/chatbot representing the merchant), where the communications facility 129 is configured to provide automated responses to customer requests and/or provide recommendations to the merchant on how to respond such as, for example, to improve the probability of a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between the e-commerce platform 100 and a merchant's bank account, and the like. The financial facility 120 may also provide merchants and buyers with financial support, such as through the lending of capital (e.g., lending funds, cash advances, and the like) and provision of insurance. In some embodiments, online store 138 may support a number of independently administered storefronts and process a large volume of transactional data on a daily basis for a variety of products and services. Transactional data may include any customer information indicative of a customer, a customer account or transactions carried out by a customer such as, for example, contact information, billing information, shipping information, returns/refund information, discount/offer information, payment information, or online store events or information such as page views, product search information (search keywords, click-through events), product reviews, abandoned carts, and/or other transactional information associated with business through the e-commerce platform 100. In some embodiments, the e-commerce platform 100 may store this data in a data facility 134. Referring again to FIG. 7, in some embodiments the e-commerce platform 100 may include a commerce management engine 136 such as may be configured to perform various workflows for task automation or content management related to products, inventory, customers, orders, suppliers, reports, financials, risk and fraud, and the like. In some embodiments, additional functionality may, additionally or alternatively, be provided through applications 142A-B to enable greater flexibility and customization required for accommodating an ever-growing variety of online stores, POS devices, products, and/or services. Applications 142A may be components of the e-commerce platform 100 whereas applications 142B may be provided or hosted as a third-party service external to e-commerce platform 100. The commerce management engine 136 may accommodate store-specific workflows and in some embodiments, may incorporate the administrator 114 and/or the online store 138.

Implementing functions as applications 142A-B may enable the commerce management engine 136 to remain responsive and reduce or avoid service degradation or more serious infrastructure failures, and the like.

Although isolating online store data can be important to maintaining data privacy between online stores 138 and merchants, there may be reasons for collecting and using cross-store data, such as, for example, with an order risk assessment system or a platform payment facility, both of which require information from multiple online stores 138 to perform well. In some embodiments, it may be preferable to move these components out of the commerce management engine 136 and into their own infrastructure within the e-commerce platform 100.

Platform payment facility 120 is an example of a component that utilizes data from the commerce management engine 136 but is implemented as a separate component or service. The platform payment facility 120 may allow customers interacting with online stores 138 to have their payment information stored safely by the commerce management engine 136 such that they only have to enter it once. When a customer visits a different online store 138, even if they have never been there before, the platform payment facility 120 may recall their information to enable a more rapid and/or potentially less-error prone (e.g., through avoidance of possible mis-keying of their information if they needed to instead re-enter it) checkout. This may provide a cross-platform network effect, where the e-commerce platform 100 becomes more useful to its merchants and buyers as more merchants and buyers join, such as because there are more customers who checkout more often because of the ease of use with respect to customer purchases. To maximize the effect of this network, payment information for a given customer may be retrievable and made available globally across multiple online stores 138.

For functions that are not included within the commerce management engine 136, applications 142A-B provide a way to add features to the e-commerce platform 100 or individual online stores 138. For example, applications 142A-B may be able to access and modify data on a merchant's online store 138, perform tasks through the administrator 114, implement new flows for a merchant through a user interface (e.g., that is surfaced through extensions/API), and the like. Merchants may be enabled to discover and install applications 142A-B through application search, recommendations, and support 128. In some embodiments, the commerce management engine 136, applications 142A-B, and the administrator 114 may be developed to work together. For instance, application extension points may be built inside the commerce management engine 136, accessed by applications 142A and 142B through the interfaces 140B and 140A to deliver additional functionality, and surfaced to the merchant in the user interface of the administrator 114.

In some embodiments, applications 142A-B may deliver functionality to a merchant through the interface 140A-B, such as where an application 142A-B is able to surface transaction data to a merchant (e.g., App: "Engine, surface my app data in the Mobile App or administrator 114"), and/or where the commerce management engine 136 is able to ask the application to perform work on demand (Engine: "App, give me a local tax calculation for this checkout").

Applications 142A-B may be connected to the commerce management engine 136 through an interface 140A-B (e.g., through REST (REpresentational State Transfer) and/or GraphQL APIs) to expose the functionality and/or data available through and within the commerce management engine 136 to the functionality of applications. For instance, the e-commerce platform 100 may provide API interfaces 140A-B to applications 142A-B which may connect to products and services external to the platform 100. The flexibility offered through use of applications and APIs (e.g., as offered for application development) enable the e-commerce platform 100 to better accommodate new and unique needs of merchants or to address specific use cases without requiring constant change to the commerce management engine 136. For instance, shipping services 122 may be integrated with the commerce management engine 136 through a shipping or carrier service API, thus enabling the e-commerce platform 100 to provide shipping service functionality without directly impacting code running in the commerce management engine 136.

Depending on the implementation, applications 142A-B may utilize APIs to pull data on demand (e.g., customer creation events, product change events, or order cancelation events, etc.) or have the data pushed when updates occur. A subscription model may be used to provide applications 142A-B with events as they occur or to provide updates with respect to a changed state of the commerce management engine 136. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time or near-real time.

In some embodiments, the e-commerce platform 100 may provide one or more of application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, and the like. In some embodiments, applications 142A-B may be assigned an application identifier (ID), such as for linking to an application (e.g., through an API), searching for an application, making application recommendations, and the like.

Applications 142A-B may be grouped roughly into three categories: customer-facing applications, merchant-facing applications, integration applications, and the like. Customer-facing applications 142A-B may include an online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways 106.

As such, the e-commerce platform 100 can be configured to provide an online shopping experience through a flexible system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products through a number of different channels 110A-B such as, for example, the merchant's online store 138, a physical storefront through a POS device 152; an electronic marketplace, through an electronic buy button integrated into a website or a social media channel). In some cases, channels 110A-B may be modeled as applications 142A-B. A merchandising component in the commerce management engine 136 may be configured for creating, and managing product listings (using product data objects or models for example) to allow merchants to describe what they want to sell and where they sell it. The association between a product listing and a channel may be modeled as a product publication and accessed by channel applications, such as via a product listing API. A product may have many attributes and/or characteristics, like size and colour, and many variants that expand the available options into specific combinations of all the attributes, like a variant that is size extra-small and green, or a variant that is size large and blue. Products may have at least one variant (e.g., a "default variant") created for a product without any options. To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Product listings may include 2D images, 3D images or models, which may be viewed through a virtual or augmented reality interface, and the like.

In some embodiments, a shopping cart object is used to store or keep track of the products that the customer intends to buy. The shopping cart object may be channel specific and can be composed of multiple cart line items, where each cart line item tracks the quantity for a particular product variant. Since adding a product to a cart does not imply any commitment from the customer or the merchant, and the expected lifespan of a cart may be in the order of minutes (not days), cart objects/data representing a cart may be persisted to an ephemeral data store.

The customer then proceeds to checkout. A checkout object or page generated by the commerce management engine 136 may be configured to receive customer information to complete the order such as the customer's contact information, billing information and/or shipping details. If the customer inputs their contact information but does not proceed to payment, the e-commerce platform 100 may (e.g., via an abandoned checkout component) transmit a message to the customer device 150 to encourage the customer to complete the checkout. For those reasons, checkout objects can have much longer lifespans than cart objects (hours or even days) and may therefore be persisted. Customers then pay for the content of their cart resulting in the creation of an order for the merchant. In some embodiments, the commerce management engine 136 may be configured to communicate with various payment gateways and services 106 (e.g., online payment systems, mobile payment systems, digital wallets, credit card gateways) via a payment processing component. The actual interactions with the payment gateways 106 may be provided through a card server environment. At the end of the checkout process, an order is created. An order is a contract of sale between the merchant and the customer where the merchant agrees to provide the goods and services listed on the order (e.g., order line items, shipping line items, and the like) and the customer agrees to provide payment (including taxes). Once an order is created, an order confirmation notification may be sent to the customer and an order placed notification sent to the merchant via a notification component. Inventory may be reserved when a payment processing job starts to avoid over-selling (e.g., merchants may control this behavior using an inventory policy or configuration for each variant). Inventory reservation may have a short time span (minutes) and may need to be fast and scalable to support flash sales or "drops", which are events during which a discount, promotion or limited inventory of a product may be offered for sale for buyers in a particular location and/or for a particular (usually short) time. The reservation is released if the payment fails. When the payment succeeds, and an order is created, the reservation is converted into a permanent (long-term) inventory commitment allocated to a specific location. An inventory component of the commerce management engine 136 may record where variants are stocked, and may track quantities for variants that have inventory tracking enabled. It may decouple product variants (a customer-facing concept representing the template of a product listing) from inventory items (a merchant-facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component of the commerce management engine 136 may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) before it marks the order as paid. The merchant may now prepare the products for delivery. In some embodiments, this business process may be implemented by a fulfillment component of the commerce management engine 136. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. Alternatively, an API fulfillment service may trigger a third-party application or service to create a fulfillment record for a third-party fulfillment service. Other possibilities exist for fulfilling an order. If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

Implementations

The methods and systems described herein may be deployed in part or in whole through a machine that executes computer software, program codes, and/or instructions on a processor. The processor may be part of a server, cloud server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more threads. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In some embodiments, the process may be a dual core processor, quad core processors, other chip-level multiprocessor and the like that combine two or more independent cores (called a die).

The methods and systems described herein may be deployed in part or in whole through a machine that executes computer software on a server, cloud server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented in different devices which may operate in wired or wireless networks. Examples of wireless networks include 4th Generation (4G) networks (e.g., Long-Term Evolution (LTE)) or 5th Generation (5G) networks, as well as non-cellular networks such as Wireless Local Area Networks (WLANs). However, the principles described therein may equally apply to other types of networks.

The operations, methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g., USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another, such as from usage data to a normalized usage dataset.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable devices, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above, and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

The invention claimed is:
1. A computer-implemented method, comprising:
identifying, using image analysis, two or more dominant colours of a product based on an image of the product, including:
selecting a portion of the image containing the product,
classifying each pixel within the portion of the image based on its colour values into a respective range within a set of ranges, each range corresponding to a colour, the set of ranges partitioning colour space based on a first resolution parameter, and
determining a count of pixels in each range and identifying the colours corresponding to the ranges with highest counts as the two or more dominant colours of the product;
causing graphical display of the two or more dominant colours on a user interface, and receiving input of a second resolution parameter different from the first resolution parameter;
based on the second resolution parameter, changing the size of the ranges and determining a second count of pixels in each range using the changed size of the ranges to change the identified two or more dominant colours corresponding to the ranges with the highest counts after the change in size;
causing graphical display of the changed two or more dominant colours;
receiving selection of at least one of the changed two or more dominant colours;
responsive to receiving the selection of the at least one of the changed two or more dominant colours, searching for products matching the at least one of the changed two or more dominant colours; and
providing one or more results of the searching, the one or more results including at least one product matching the at least one of the changed two or more dominant colours.
2. The method of claim 1, wherein searching includes searching a product database using a search query that includes, as a query parameter, the at least one of the two or more dominant colours.
3. The method of claim 1, wherein the one or more results include at least one product image tagged with the at least one of the two or more dominant colours.
4. The method of claim 3, wherein the at least one product image includes a product image tagged with a dominant colour value, and wherein the dominant colour value is within a maximum distance of said at least one of the two or more dominant colours.
5. The method of claim 1, wherein selecting a portion of the image includes detecting the product within the image using object detection wherein the selected portion of the image contains the product and excludes at least a part of the image not containing the product.
6. The method of claim 5, wherein selecting a portion includes at least one of:
applying a bounding box based on the object detection to crop a part of the image not depicting the product to obtain a cropped image; or
applying a mask selected based on the product to select the portion of the image containing the product.
7. The method of claim 5, wherein selecting a portion includes selecting a machine learning model associated with a product class containing the product, and applying the machine learning model to select the portion of the image.
8. The method of claim 1, wherein the image analysis includes selecting a machine learning model associated with a product class containing the product, and applying the machine learning model to perform the classifying.
9. The method of claim 1, wherein the classifying includes applying k-means clustering to the pixels within the portion, and wherein the k values of the k-means clustering are set based on a product class to which the product belongs.
10. The method of claim 1, wherein the first resolution parameter includes a coarse colour analysis and the second resolution parameter includes a fine colour analysis.
11. The method of claim 1, wherein the graphical display is overlaid on the image of the product.
12. The method of claim 1, wherein graphical display of the changed two or more dominant colours includes displaying a primary dominant colour and a secondary dominant colour, and wherein receiving selection includes receiving selection of the secondary dominant colour, and wherein a search query parameter specifies the secondary dominant colour.
13. The method of claim 1, wherein searching includes a search for the selected at least one of the changed two or more dominant colours as a secondary dominant colour, and wherein the search results include an image of the at least one product tagged with the at least one of the changed two or more dominant colours as its secondary dominant colour.
14. The method of claim 1, further comprising receiving user input identifying a point on the image, and performing object detection within the image based, at least in part, on the point to identify the product within the image.
15. The method of claim 1, further comprising obtaining the image of the product from a camera within a user device or from a product record in a product database.
16. A computing device, comprising:
a processor; and
a memory coupled to the processor, the memory storing instructions that, when executed by the processor, are to cause the processor to:
identify, using image analysis, two or more dominant colours of a product based on an image of the product, including:
selecting a portion of the image containing the product,
classifying each pixel within the portion of the image based on its colour values into a respective range within a set of ranges, each range corresponding to a colour, the set of ranges partitioning colour space based on a first resolution parameter, and determining a count of pixels in each range and identifying the colours corresponding to the ranges with highest counts as the two or more dominant colours of the product;

cause graphical display of the two or more dominant colours on a user interface, and receive input of a second resolution parameter different from the first resolution parameter;

based on the second resolution parameter, change the size of the ranges and determine a second count of pixels in each range using the changed size of the ranges to change the identified two or more dominant colours corresponding to the ranges with the highest counts after the change in size;

cause graphical display of the changed two or more dominant colours;

receive selection of at least one of the changed two or more dominant colours;

responsive to receiving the selection of the at least one of the changed two or more dominant colours, search for products matching the at least one of the changed two or more dominant colours; and provide one or more results of the searching, the one or more results including at least one product matching the at least one of the changed two or more dominant colours.

17. A non-transitory, computer-readable medium storing computer-executable instructions that, when executed by a processor, are to cause the processor to:

identify, using image analysis, two or more dominant colours of a product based on an image of the product, including:

selecting a portion of the image containing the product, classifying each pixel within the portion of the image based on its colour values into a respective range within a set of ranges, each range corresponding to a colour, the set of ranges partitioning colour space based on a first resolution parameter, and determining a count of pixels in each range and identifying the colours corresponding to the ranges with highest counts as the two or more dominant colours of the product;

cause graphical display of the two or more dominant colours on a user interface, and receive input of a second resolution parameter different from the first resolution parameter;

based on the second resolution parameter, change the size of the ranges and determine a second count of pixels in each range using the changed size of the ranges to change the identified two or more dominant colours corresponding to the ranges with the highest counts after the change in size;

cause graphical display of the changed two or more dominant colours;

receive selection of at least one of the changed two or more dominant colours;

responsive to receiving the selection of the at least one of the changed two or more dominant colours, search for products matching the at least one of the changed two or more dominant colours; and provide one or more results of the searching, the one or more results including at least one product matching the at least one of the changed two or more dominant colours.

* * * * *